May 12, 1964

G. O. SINEX 3,132,987

LIQUID RECONCENTRATING APPARATUS

Filed March 1, 1957

INVENTOR.
Gene O. Sinex

BY

ATTORNEYS

INVENTOR.
Gene O. Sinex

United States Patent Office 3,132,987
Patented May 12, 1964

3,132,987
LIQUID RECONCENTRATING APPARATUS
Gene O. Sinex, Farmington, N. Mex., assignor to American Tank and Steel Corporation, Farmington, N. Mex., a corporation of New Mexico
Filed Mar. 1, 1957, Ser. No. 643,472
5 Claims. (Cl. 159—31)

This invention relates to apparatus for concentrating liquids and particularly to an apparatus for reconcentrating liquid dehydrating agents employed in gas-treating systems.

Petroleum gas as produced at the well head commonly includes liquid components comprising hydrocarbons and water. Systems employed for treating such gases are provided with apparatus for separating the liquid components and also for removing water vapor from the gaseous components. The gas dehydrating equipment commonly employed comprises an extended surface structure for effecting intimate contact of the gas with a liquid dehydrating medium such as either diethylene glycol or triethylene glycol. It is desirable to minimize the loss of the dehydrating agent which is normally recirculated after the absorbed water has been removed in a reconcentrating unit. Various types of reconcentrators have been employed with different degrees of effectiveness in the removal of water vapor and in the maintaining of the drying agent in the system. Accordingly, it is an object of the present invention to provide an apparatus for reconcentrating a dehydrating agent including an improved arrangement for minimizing loss of the dehydrating agent during the reconcentrating process.

It is another object of this invention to provide an improved and compact apparatus for reconcentrating dehydrating agents employed in gas-treating systems.

Briefly, in carrying out the objects of this invention in one embodiment thereof, a dehydrating liquid concentrator is constructed to comprise upper and lower horizontal cylinders connected by an overflow pipe providing communication between the cylinders near one end. The upper cylinder is provided with a fire box or heater located below the liquid level as determined by the overflow pipe, and weak liquid to be concentrated is supplied to the upper cylinder where it is heated and the water boiled off. A heat exchanger is provided to heat the supplied weak solution so that the water flashes to vapor on entering the cylinder. The gas and water vapor is withdrawn through an outlet connection including a horizontal condenser mounted above the upper cylinder. Water vapor cooled and liquefied in the condenser is returned directly to the upper cylinder while a packing medium of glass fiber or insulating material which fills the condenser cylinder maintains water saturation and prevents the discharge of liquid with the water vapor which facilitates the return of the liquid to the boiler; for this latter purpose strands of wire, preferably of stainless steel are woven into the packing to provide paths for the liquid to follow downwardly through the packing so that the liquid is readily removed from the packing and affords a freer passage for the gas and water vapor toward the outlet of the condenser.

The features of novelty which characterize the invention are pointed out in the appended claims. The invention itself, however, together with further objects and advantages thereof will be better understood from the following description taken in connection with the accompanying drawings in which:

Figure 1:
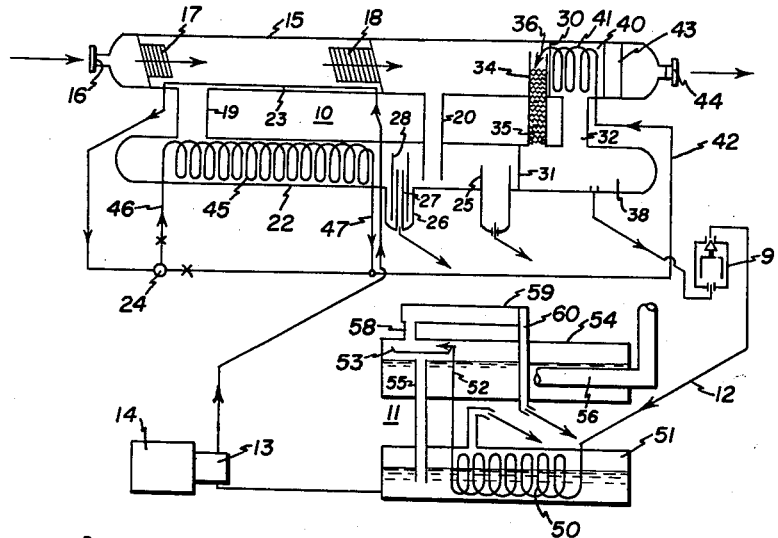
FIG. 1 is a diagrammatic view of a petroleum gas dehydrating system provided with a reconcentrator embodying the invention.

Referirng now to the drawings, the gas-treating apparatus shown in FIG. 1 comprises a combined gas and liquid separating and gas dehydrating apparatus 10 and a liquid reconcentrating apparatus 11 connected through a gas trap 9 and a conduit 12 to receive weak dehydrating liquid from the apparatus 10 and to return the liquid by operation of the pump 13 driven by a motor 14. The dehydrating liquid which, for example, may be diethylene glycol, is heated during the reconcentrating process and this heat is employed in heat exchange elements in the gas-treating apparatus to render the gas-treating process more effective. During the operation of the system, gas from the well head is admitted to the apparatus 10 through a connection 16. The gas, which enters at a pressure of say 800 pounds per square inch, includes entrained liquid particles which may be hydrocarbons, water, and hydrates. The gas and liquid stream strikes a series of baffles 17 constituting a scrubbing element, which removes a portion of the liquid mechanically, and then passes further through the upper drum 15 to a second scrubber 18 which removes a further portion of the entrained liquid. The liquid removed in the cylinder 15 passes downwardly through connections 19 and 20 to a lower horizontal cylinder 22. Certain of the liquid components may be paraffins and the like which tend to solidify and accumulate in the cylinder 15, and in order to minimize the accumulation of such substances, a heat exchanger 23 is provided through which hot liquid concentrate from the reconcentrator 11 is passed on its way to a three-way control valve 24. The liquids separated from the gases in the cylinder 15 are collected in the cylinder 22 to a level determined by an oil or hydrocarbon liquid separator 25. The heavier liquids, particularly water, collect in the bottom of the cylinder 22 and pass into a water separator 26 from which the water is removed through an overflow pipe 27, the water separator being provided with an upstanding baffle 28 which prevents the admission of the collected oil to the water separator, the open end of the baffle 28 being above the oil overflow baffle 25. The right ends of both the upper and lower chambers are closed, the cylinder 15 being closed by a partition 30 and the cylinder 22 by a partition 31. The portions of the cylinders to the right of the partitions 30 and 31 are interconnected by a tube 32 and constitute the dehydrating section of the apparatus. The gas which flows through the cylinder 15 is discharged through an upright outlet connection 34 and flows downwardly into the horizontal cylinder 22. The upper end of cylinder 34 constitutes a gas and liquid contact column or contacter and in order to provide a large extended surface, the column 34 is filled with a stack of discs of expanded metal indicated at 35; these discs provide the extended surface over which concentrated diethylene glycol is circulated from a pipe outlet or spray head 36 at the top of the column 34. The concentrated diethylene glycol is relatively cool and as it flows over the surfaces provided by the gas contact material 35, it is maintained in engagement with the gas flowing out from the scrubber area of the cylinder 15 and water vapor in the gas is absorbed on contact with the gas absorbing agent; the diluted or wet agent then flows downwardly into the bottom of a chamber 38 at the right end of the cylinder 22 and is removed from the chamber through the conduit 12 leading to the reconcentrator 11. The discharge orifice of the gas trap 9 acts as the pressure reducing element between the high pressure dehydrator and the reconcentrator which is at substantially atmospheric pressure. The dried gas flows from the chamber 38 upwardly through the connection 32 into a chamber 40 at the right end of the cylinder 15. The gas in the chamber 40 passes over a coil heat exchanger 41 in heat exchange with the relatively warm concentrated glycol flowing toward the spray head 36 from a conduit 42 connected to one outlet of the valve 24. This flow of gas over the heat exchanger 41 cools the concentrated liquid before it enters the column 34. After the gas passes over the heat exchanger 41, it flows through a scrubber 43 which removes any remaining liquid entrained in the gas and the gas then flows through an outlet 44 to its point of use or transmission. Any liquid removed by the scrubber 43 flows back into the chamber 38 through the upright passage 32.

In order to prevent the solidifying of liquids within the cylinder 22 during their separation by gravity, and to aid in the dissolution or separation of any oil-water emulsions, additional heat may be supplied by heat exchange with a coil 45 which provides a passage for the concentrated liquid from a second outlet of the valve 24 through a connection 46, thence through the coil 45 and back through a connection 47 into the outlet line 42. The valve 24 is a three-way valve of the type which affords proportioning of the liquid flowing through the two outlets and it will thus be apparent that by selective positioning of the valve 24, the proportion of liquid flowing through the heat exchanger 45 and that going directly to the conduit 42 may be determined in accordance with the requirements for heating of the liquids accumulating in the cylinder 22.

The wet diethylene glycol or other absorbing liquid which is collected in the chamber 38 flows through the pipe 12 to the reconcentrator 11. The weak liquor entering the concentrator flows through a heat-exchange coil 50 in a lower tank or chamber 51 where it absorbs heat from concentrated liquid collecting in the chamber and then flows upwardly through a pipe 52 onto a tray 53. The tray 53 is arranged in an upper chamber or cylinder 54 having an overflow pipe 55 connected with the lower cylinder 51. The height of the pipe 55 determines the level of liquid within the chamber 54, and a heater 56 is arranged below the level of liquid to boil the liquid and remove water vapor therefrom. Water vapor and gas flowing from the chamber 54 passes out through a connection or conduit 58 to an absorber condenser 59 in which the diethylene glycol or other gas-absorbing fluid is liquefied together with a portion of the water vapor, the liquids flowing back to the chamber 54 through the connection 58, and any non-condensible gas together with water vapor being removed from the condenser 59 through a conduit 60. The conduit 60 passes through the boiler chamber 54 so that the water vapor therein is superheated before it is discharged. The concentrated glycol flows through the pipe 55 into the lower chamber 51 from which it is recirculated in the system by the pump 13. A vent pipe 61 at the top of the chamber 51 is open to the atmosphere.

Figure 2:
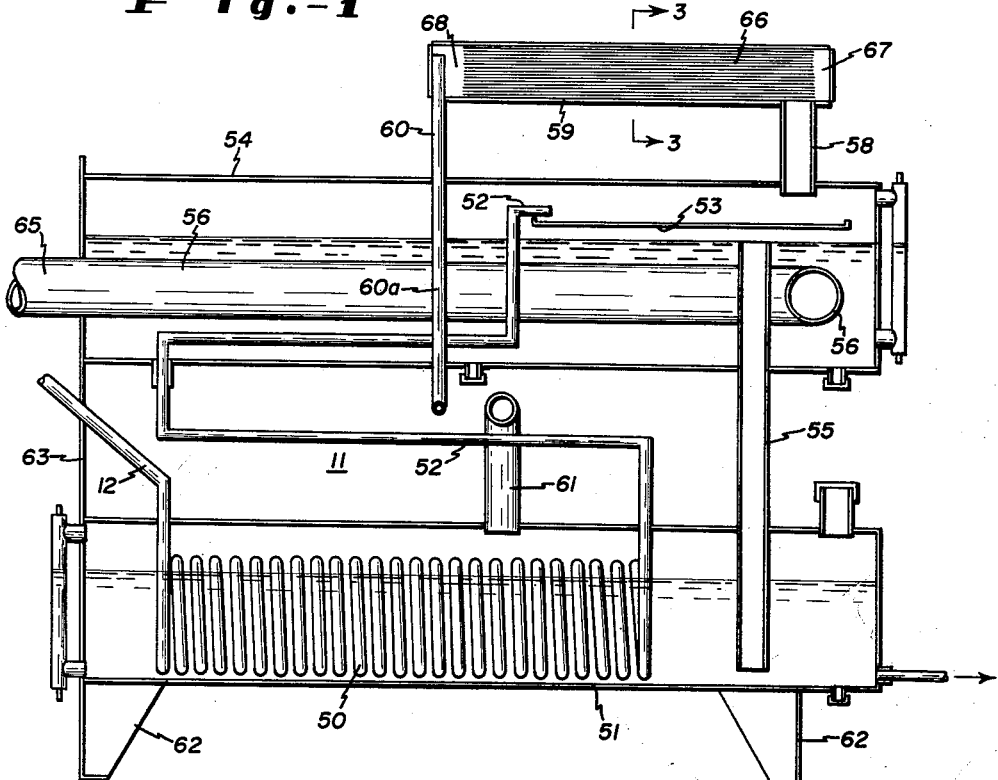
FIG. 2 is a sectional elevation view of the reconcentrator embodying the invention.
Figure 3:
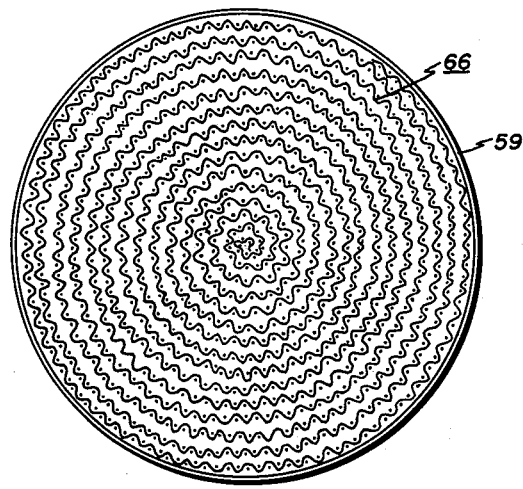
FIG. 3 is an enlarged sectional view of the reflux condenser of the reconcentrator of FIG. 2.
Figure 4:
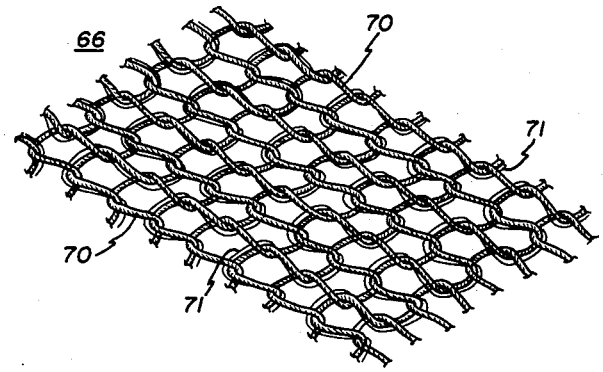
FIG. 4 is an enlarged view of a portion of the packing employed in the condenser as it appears before rolling.

The details of construction of the reconcentrator unit 11 are shown in FIGS. 2, 3 and 4. As shown in FIG. 2, the cylindrical tank 51 is mounted on legs 62 and both the cylinders 51 and 54 are secured to a common end plate or wall 63 at their left ends and are held in spaced relationship by the large conduit 55 at their right ends. The heater 56 employs a burner of the long-flame type (not shown) and comprises a U-turn within the chamber 54, only one leg of which is shown in the drawing in order to avoid additional complication of the figure. The hot gases flow from the left end, indicated at 65, toward the right end of the tube and thence backwardly through the section not shown toward a stack connection at the left end. The diethylene glycol or other liquid collected in the tank 54 to the level determined by the height of the inlet to the pipe 55 is thus maintained hot and water absorbed by the liquid boiled off and discharged through the connection 58 to the condenser 59. The wet or weak diethylene glycol flowing to the coil 50 from the conduit 12 is first heated by the liquid glycol collected in the lower chamber 51 and then flows out through the connection 52 to the upper chamber 54. Before the glycol is discharged on the tray 53, it passes through an additional portion of the tube 52 in heat exchange with the hot liquid in the boiler, and, when it is discharged from the tube 52 above the tray 53, a large portion of the water content of the liquid flashes into vapor immediately and flows out through the condenser 59. This flashing of the water vapor is advantageous since a large portion of the vapor thus formed may pass through the condenser and reach the outlet pipe 60 without being mixed with the liquids in the boiler 54; only that portion of the water vapor which may be liquefied in the condenser 59 is returned to the liquid in the boiler 54 for re-vaporization. Any entrained noncondensible gases which reach the outlet 60 together with water vapor are discharged through a portion 60a of the conduit 60 which portion lies within the boiler 54, and the water vapor which has been cooled by passage through the condenser 59 thus again absorbs heat and is superheated so that it is possible to conduct the water vapor a substantial distance away from the apparatus without danger of condensation. This arrangement is advantageous in freezing weather when condensation might be followed by freezing of the condensed water and consequent interruption of the operation of the system.

The condenser 59 is provided with a body of packing material 66 which fills the entire condenser except at the right and left ends where the condenser is left free of the packing to provide inlet and outlet chambers 67 and 68 respectively, these chambers acting as manifolds for the distribution and collection of the fluids flowing through the condenser. The packing material 66 prevents the passage of liquid particles from the inlet to the outlet of the condenser and comprises a mass of fibrous material such as glass wool, which is maintained water saturated throughout the operation of the system. The fibers of such material are inherently water impervious and nonporous and it is well-known that the packing material formed thereof has passages between the fibers. Glycol liquid particles and water condensed within the space occupied by and on the surfaces of the packing flow downwardly to the bottom of the condenser 59 and thence return from the condenser to the boiler 54 through the inlet connection 58. In order to minimize the accumulation of liquid within the packing material 66, a large number of wires preferably of stainless steel are provided within the packing and afford paths through the fibrous packing along which the liquid readily passes toward the bottom of the chamber. A preferred form of packing material for the condenser 59 is a loosely-woven glass wool fabric in which strands of stainless steel are woven at intervals. A cross section of the condenser 59 is shown in FIG. 3, and the packing material 66, as illustrated, comprises a rolled mass of fabric material completely filling the cross section of the condenser. The manner in which the fabric material is woven is shown more clearly in FIG. 4, which is an enlarged detail view of a small portion of the fabric; the fabric as illustrated comprises threads of glass fiber 70 and at regular intervals strands of stainless steel wire 71 are woven with the threads 70. When the fabric is rolled, as shown in FIG. 3, the stainless steel wires are contained throughout the entire packing and provide paths or guides along which the downwardly-moving liquid may pass readily so that it does not build up in the mass of fibrous material where it would have a blocking effect with possible driving of the liquid toward the outlet and its entrainment with the outlet vapor. In FIG. 3 the material 66 has been shown diagrammatically for purposes of illustration as though the turns of the fabric were spaced from one another; however, in practice, the turns of the packing are in engagement leaving substantially no open longitudinal passages which might act as bypasses around the packing.

The condenser 59 provides a simple straight-line path for the water vapor flowing from the boiler to the water discharge line 60 and also provides an arrangement for returning any collected liquid or condensed water to the condenser inlet, thus providing a reflux action of the liquid while affording ready direct passage of the water vapor from the inlet to the outlet. Furthermore, the arrangement for maintaining water saturation of the fibrous material together with an easy transverse path for the flow of collected liquid assures minimum likelihood of flooding of the packing. Should any entrained water reach the outlet and flow into the pipe 60 it would necessarily be in small quantities and will be vaporized by the absorption of heat on passing through the section 60a of the conduit within the boiler 54.

The arrangement of the liquid reconcentrator 11 to secure effective use of heat exchange and initial flashing of the water vapor, together with the arrangement of the reflux condenser 59, is particularly advantageous for installations in outdoor or portable systems for the treatment of gas at the well-head, and has the further advantage of minimum likelihood of condensing and freezing of the removed water vapor.

While the invention has been described in connection with a specific embodiment thereof, various modifications and other applications will occur to those skilled in the art. Therefore, it is not intended that the invention be limited to the details of construction illustrated and described, and it is intended by the appended claims to cover all modifications which fall within the spirit and scope of the invention.

I claim:

1. An apparatus for reconcentrating liquid dehydrating agents and the like by the removal of moisture therefrom comprising a boiler, means for heating said boiler, means for supplying a mixture of water and dehydrating agent to said boiler, an absorber condenser mounted above said boiler, means providing a passage opening into the lower portion of said condenser for supplying vaporized mixture from said boiler to said condenser, means providing a vapor outlet from said condenser above and remote from said passage, a water saturable packing means arranged in said condenser between said passage and said outlet and constituting an absorption bed for contacting the entire stream of vapors passing through said condenser to remove therefrom the dehydrating agent together with the condensed portion of the water and for collecting the resulting liquid and returning it through said passage to said boiler, and conduit means connected in communication with the vapor outlet of said condenser for conducting water vapor from said condenser in heat exchange relationship with the liquid in said boiler for superheating the water vapor discharged from said condenser.

2. An apparatus for reconcentrating liquid dehydrating agents and the like by the removal of moisture therefrom comprising means providing a boiler chamber, means for heating liquid contained in said chamber, means for supplying wet dehydrating agent to said chamber, a condenser above said chamber, a liquid collecting sump below said chamber, an overflow conduit connecting said chamber and said sump and determining the level of liquid in said chamber, means providing a passage connecting the top of said chamber and the bottom of said condenser for conducting vapor to said condenser and for returning liquid to said chamber above the level of liquid therein, said condenser having a vapor outlet remote from said passage, a mass of packing material in said condenser for removing liquid from the vapor flowing toward said outlet, and a baffle plate extending horizontally in said chamber above the level of liquid therein between and spaced from said passage and said overflow conduit, said agent supplying means opening into said chamber over said baffle plate whereby said overflow conduit is shielded from the fluid discharged from said supplying means and from liquid returning to said chamber through said passage.

3. An apparatus for reconcentrating liquid dehydrating agents and the like by the removal of moisture therefrom comprising means providing a boiler chamber, means for heating liquid contained in said chamber, means for supplying wet dehydrating agent to said chamber, a condenser above said chamber, a liquid collecting sump below said chamber, an overflow conduit connecting said chamber and said sump and determining the level of liquid in said chamber, means providing a passage connecting the top of said chamber and the bottom of said condenser for conducting vapor to said condenser and for returning liquid to said chamber, said condenser having a vapor outlet remote from said passage, a mass of packing material in said condenser for removing liquid from the vapor flowing toward said outlet, and a baffle plate extending horizontally in said chamber between and spaced from said passage and said overflow conduit, said agent supplying means opening into said chamber above said baffle plate whereby said overflow conduit is shielded from the fluid discharged from said supplying means and from liquid returning to said chamber through said passage, said baffle plate being formed to provide a shallow liquid retaining pan and said supplying means including a portion in heat exchange relationship with the liquid in said chamber whereby the wet dehydrating agent is heated before discharge from said supplying means.

4. An apparatus for reconcentrating liquid dehydrating agents and the like by the removal of moisture therefrom comprising a boiler, means for heating said boiler, means for supplying a mixture of water and dehydrating agent to said boiler, an absorber condenser comprising an elongated tube mounted in a substantially horizontal position above said boiler, means providing a passage opening into the lower portion of said condenser for supplying vaporized mixture from said boiler to said condenser, means providing a vapor outlet from said condenser above and remote from said passage, a water saturable packing means arranged in said condenser between said passage and said outlet, said packing means comprising a mass of fibrous material and means providing paths for the easy flow of liquid downwardly through said packing transversely of the axis of said tube comprising a multiplicity of metal strands extending through said material, said packing means constituting an absorption bed for contacting the entire stream of vapors passing through said condenser to remove therefrom the dehydrating agent together with condensed water and for collecting the resulting liquid by flow transversely of said tube through said packing to the bottom of said tube and returning it through said passage to said boiler.

5. An apparatus for reconcentrating liquid dehydrating agents and the like by the removal of moisture therefrom comprising a boiler, means for heating said boiler, means for supplying a mixture of water and dehydrating agent to said boiler, an absorber condenser comprising an elongated tube mounted in a substantially horizontal position above said boiler, means providing a passage opening into the lower portion of said condenser for supplying vaporized mixture from said boiler to said condenser, means providing a vapor outlet from said condenser above and remote from said passage, a water saturable packing means arranged in said condenser between said passage and said outlet, said packing means comprising a roll of glass fiber fabric extending longitudinally of said condenser and means providing paths for the easy flow of liquid downwardly through said packing transversely of the axis of said tube comprising a multiplicity of metal threads interwoven with the glass fiber, said packing constituting an absorption bed for contacting the entire stream of vapors passing through said condenser to remove therefrom the dehydrating agent together with condensed water and for collecting the resulting liquid by flow transversely of said tube through said packing to the bottom of said tube and returning it through said passage to said boiler.

References Cited in the file of this patent

UNITED STATES PATENTS

| | | |
|---|---|---|
| 1,258,562 | Harris | Mar. 5, 1918 |
| 1,882,750 | Black | Oct. 18, 1932 |
| 1,951,956 | Wood | Mar. 20, 1934 |
| 2,625,800 | Berry | Jan. 20, 1953 |
| 2,665,750 | Kals | Jan. 12, 1954 |
| 2,713,919 | Walker et al. | July 26, 1955 |

FOREIGN PATENTS

| | | |
|---|---|---|
| 143,541 | Austria | Nov. 11, 1935 |